No. 729,183. Patented May 26, 1903.

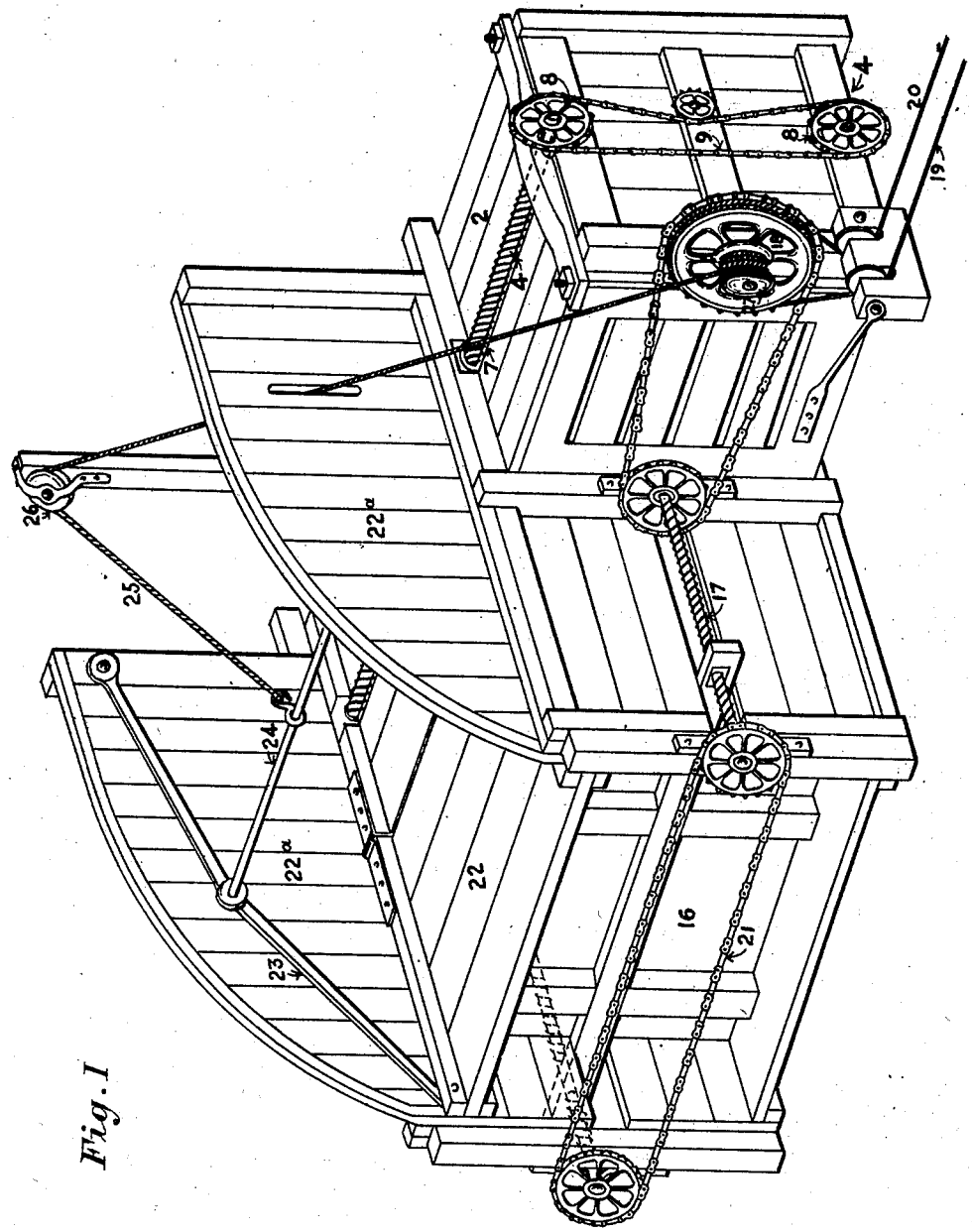
Fig. I

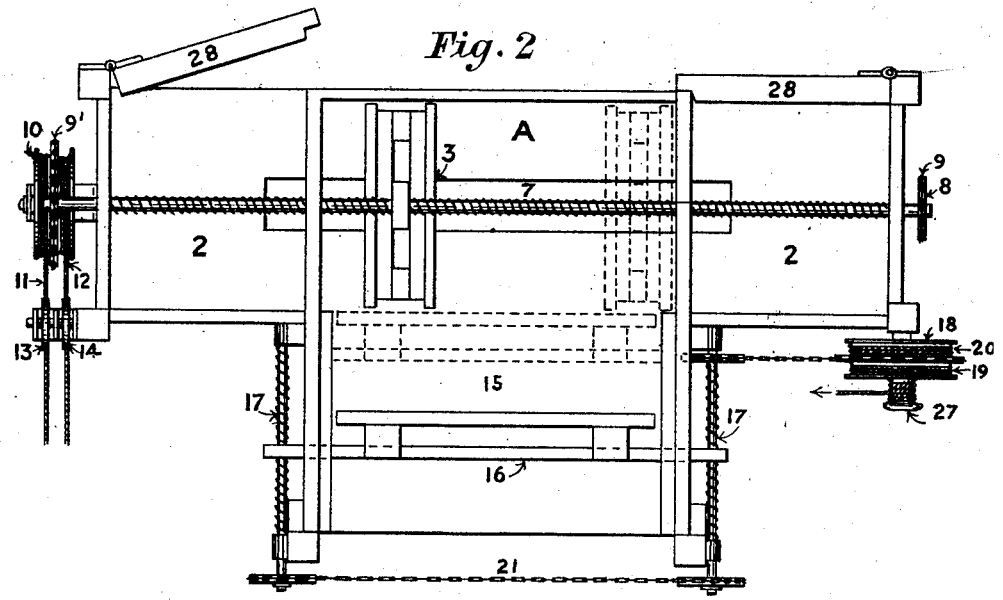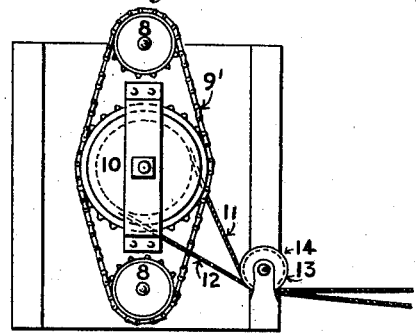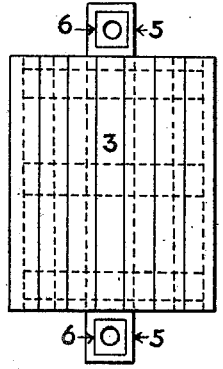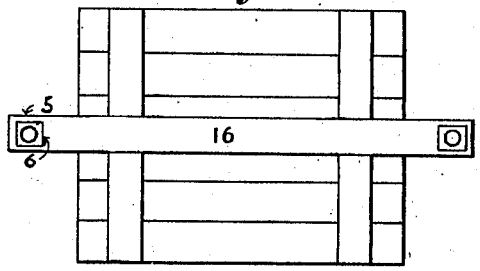

UNITED STATES PATENT OFFICE.

JENS JENSEN, OF LIVERMORE, CALIFORNIA.

BALING-PRESS.

SPECIFICATION forming part of Letters Patent No. 729,183, dated May 26, 1903.

Application filed July 3, 1902. Serial No. 114,244. (No model.)

*To all whom it may concern:*

Be it known that I, JENS JENSEN, a citizen of the United States, residing at Livermore, county of Alameda, State of California, have invented an Improvement in Baling-Presses; and I hereby declare the following to be a full, clear, and exact description of the same.

My invention relates to improvements in baling-presses of the horizontal type. Its object is to provide a hay-press of simple construction and of largely-increased capacity.

It consists of the parts and the constructions and combinations of parts, which I will hereinafter describe and claim.

Figure 1 is an isometrical view of baling-press. Fig. 2 is a plan view of baling-press. Fig. 3 is an end of press-box, showing drum connected with sprocket-wheels. Fig. 4 is the follower for pressing hay. Fig. 5 is the follower for pushing hay into press-box.

A represents a horizontal press-box having the baling-chambers 2 at either end. A follower 3 traverses the space in said box between the chambers, so as alternately to compress the charge into one or the other of the chambers. This follower is operated by means of the worms 4, disposed above and below and extending longitudinally of the press. The follower has projections 5, embracing nuts 6, which travel to and fro on the worms, according as the latter are turned in one direction or the other. The press-box is suitably slotted at 7 to accommodate the projections. The ends of the worm-shafts carry sprocket-wheels 8, and they are connected at one end of the box by chains 9 and at the other end with a drum 10 by chains 9', whereby the shafts are operated in unison. Power is transmitted to drive these shafts in one direction or the other through the drum 10, which has two chains or ropes secured to it in such a manner that one rope, 11, passes around over the top of the drum and through a direction-pulley 13 and the other, 12, passes around and beneath the drum and through a pulley 14. A team is hitched to either of these ropes, whereupon that rope is unwound and the other rope is wound up, while the follower is made to reciprocate in the press-box, according as desired.

Centrally disposed of the press-box is the feed-chamber 15, having an opening into the path of the follower 3. A follower 16 reciprocates in this chamber at right angles to the line of travel of said first-named follower. When at the limit of its inward movement, the follower 16 is substantially flush with the inner wall of the press-box. This feed-follower 16 is operated by worm-shafts 17 similarly as the first-named follower, and are driven from the drum 18, to which the oppositely-wound ropes 19 20 are attached. The two shafts 17 are connected by the sprocket-chains 21, whereby they are operated in unison. The sides and bottom of the chamber 15 are permanently closed, while the top is closed by a door 22, hinged at the rear and operated by means of the toggle knee-levers 23.

22ª represents vertical guide-walls, between which the door operates.

The fulcrum-bar 24 is connected, by means of a rope 25, passing through a sheave 26, with a small drum 27 on the drum 18. Thus when the rope 20 is drawn outward to move the feed-follower to the outer end of the feed-chamber the spool 27 will turn to wind up the rope 25 and open the door 22 to allow the chamber to be filled, while an opposite rotation of the drum 18 and movement of the follower will cause the door to close and retain the hay in the feed-chamber, and so direct it into one or the other of the compression-chambers 2. The bale is discharged from the latter through the doors 28.

With this press it is possible to secure a greatly-increased output over presses of the ordinary type, as the chamber 15 is capable of taking a sufficient quantity of hay as to require but a single charge to form a bale. Consequently every time the plunger 3 is operated it moves to compress an entire bale in one or the other of the chambers 2. By the time the bale is bound the feed-chamber has been filled, the door closed, and the contents of the chamber pushed by plunger 16 into the other compression-chamber 2 ready for the return movement of the plunger 3.

Having thus described my invention, what I claim, and desire to secure by Letters Patent, is—

1. The combination in a baling-press, of a horizontal press-box, a follower reciprocable therein, a feed-chamber centrally disposed of said box, a hinged door for said chamber, a follower reciprocable in the feed-box and means including a worm mechanism for the follower of the feed-chamber and a winding mechanism and jointed connection for the door, by which the door and the last-named follower are given a coördinate movement.

2. The combination in a baling-press, of a horizontal press-box, a follower reciprocable therein, a feed-chamber at the side thereof, a follower reciprocable horizontally in said chamber, and adapted to discharge the contents of the latter into the path of the first-named follower, separate worm mechanisms for each of the followers by which said followers are operated independently, said feed-chamber having an opening at the top, a hinged door adapted to close said opening, and means including a winding mechanism and jointed connections by which said door and feed-follower are given a coördinate movement.

3. In a baling-press, the combination of a horizontal press-box, a follower reciprocable therein, worm-shafts extending lengthwise of said box, projections on said follower engaging said shafts, means for operating said shafts in unison, and means including winding-drums and oppositely-coiled ropes by which said shafts may be turned in one direction or the other as desired.

4. In a baling-press, the combination of a horizontal press-box, a follower movable therein, worm-shafts exterior to the box, projections on said follower engaging said shafts, means for revolving said shafts, said means including a drum, oppositely-wound ropes or cables secured to said drum and connections between said drum and shafts whereby the latter are revolved in unison.

5. The combination in a baling-press, of a horizontal press-box, a follower reciprocable therein, a centrally-disposed feed-chamber, a follower reciprocable in said chamber and adapted to discharge into the path of the press-box follower, means for moving said followers, an opening in the top of said feed-chamber, a door hinged on the inner side of said opening, vertical guide-walls between which said door is movable, knee-levers having one arm pivoted to the door and the other to the press-frame, and connections between said levers and the operating means of the feed-follower whereby the latter and the door are given a coördinate movement.

In witness whereof I have hereunto set my hand.

JENS JENSEN.

Witnesses:
G. S. FITZ GERALD,
GEO. BECK.